Patented May 17, 1938

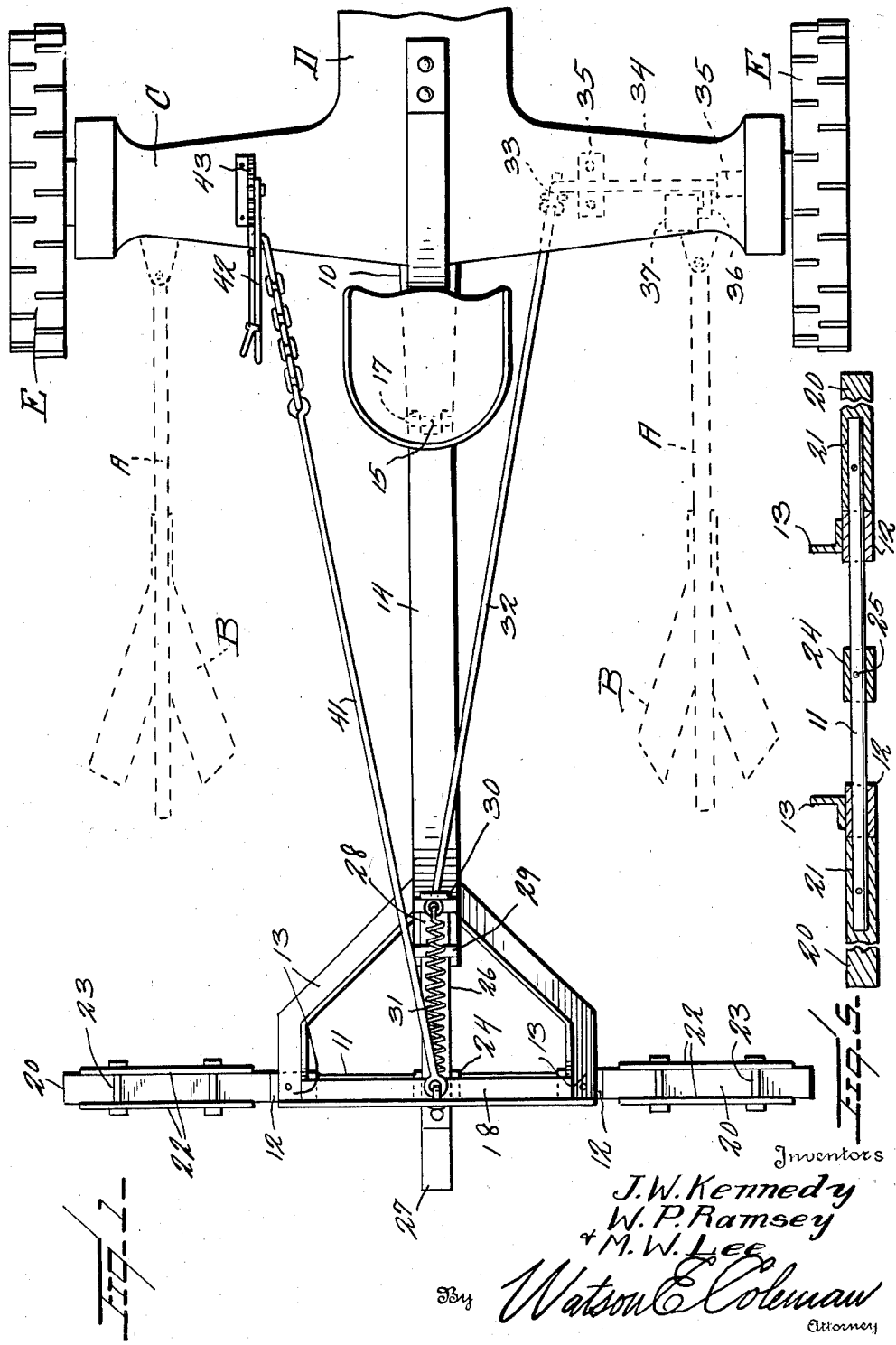

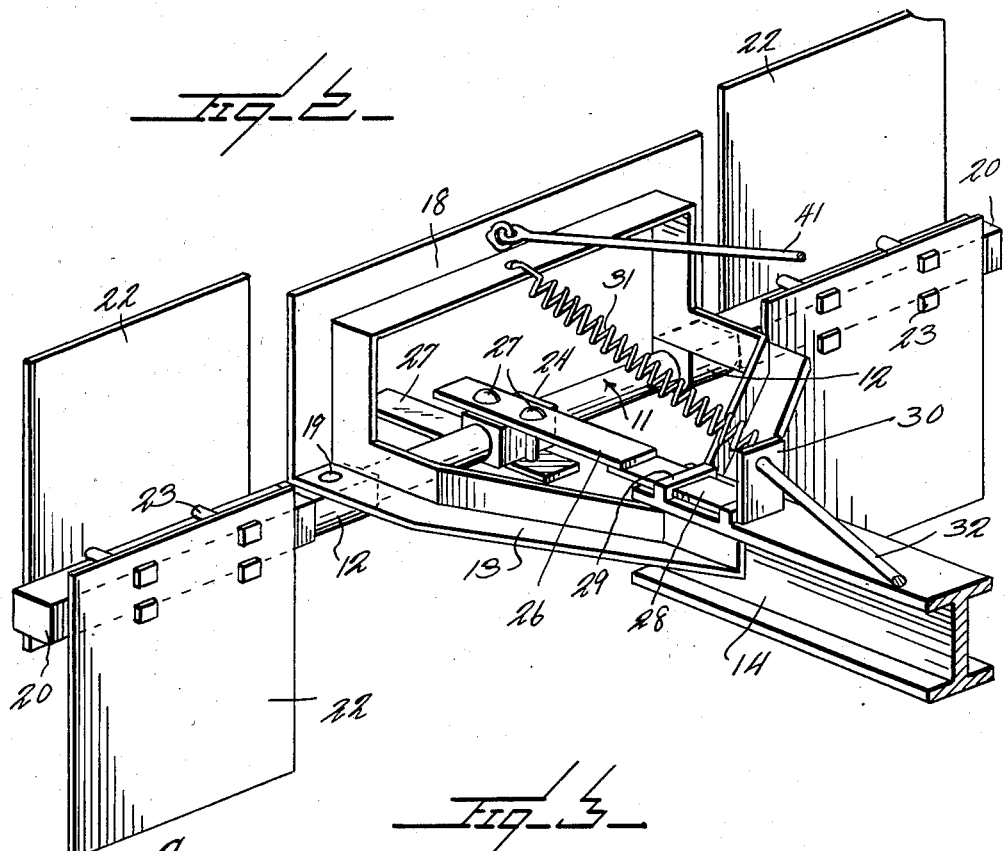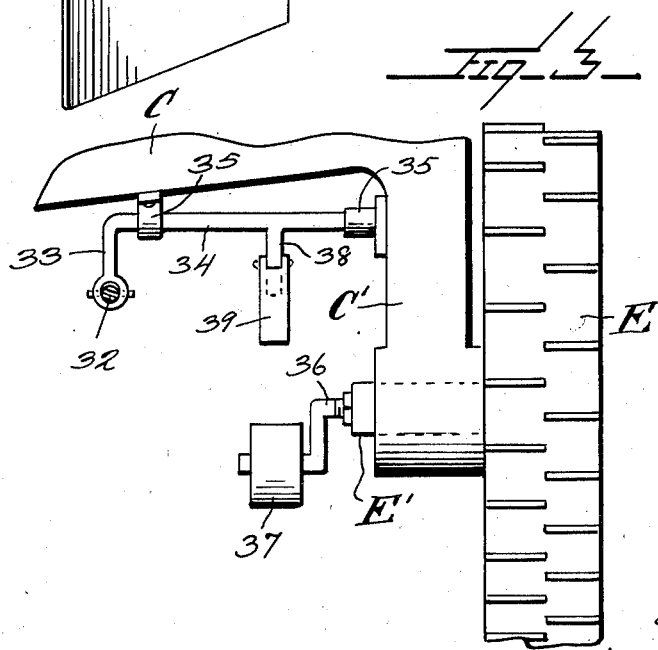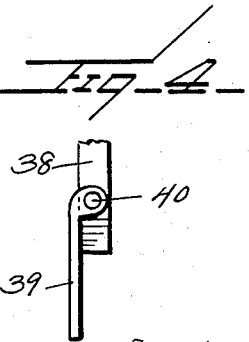

2,117,669

UNITED STATES PATENT OFFICE 2,117,669

TWO-ROW LISTER FURROW BLOCKER

James W. Kennedy, William P. Ramsey, and Marrion W. Lee, Oklaunion, Tex., assignors of one-fourth to said Kennedy, one-fourth to said Ramsey, one-fourth to Lee and Morris, Vernon, Tex., a partnership composed of Marrion W. Lee and Grover C. Morris, and one-fourth to M. K. Berry, Vernon, Tex.

Application October 31, 1936, Serial No. 108,650

4 Claims. (Cl. 97—55)

This invention relates to listers and particularly to an attachment adapted to be applied to a two-row lister whereby the furrows formed by the plows of the lister are blocked or dammed at spaced intervals to thereby retain water in said furrows.

The general object of this invention is to provide an attachment of this character which is very simple and which will be automatically operated to depress blocker blades at intervals into the furrow which will carry the earth back with the blades until each blade leaves the furrow, thus forming such a dam.

Another object is to provide a structure of this character in which there are two sets of blocker blades, these blades being adjustable either to 36-inch or 42-inch rows.

A further object is to provide a mechanism of this character which may be used either in connection with a horse-drawn lister or a tractor-drawn lister.

A still further object is to provide a structure of this character in which the blocker blades are mounted upon a shaft rotatable through a one-half revolution to bring a blocker blade into operative position in the furrow, this shaft being automatically operated at intervals by a trip wheel.

Still another object is to provide means whereby the attachment may be lifted entirely free from the ground if so desired.

Our invention is illustrated in the accompanying drawings wherein:

Figure 1 is a top plan view of the rear portion of a tractor and our attachment.

Figure 2 is a perspective view of the rear portion of the attachment.

Figure 3 is a rear elevation of a portion of the tractor showing the operating mechanism for the blocker blades.

Figure 4 is a fragmentary side elevation of the trip arm.

Figure 5 is a longitudinal section through the blade carrying shaft.

In these drawings, we have shown the attachment as applied to a lister in which the lister plow beams A carrying plows B are attached to the rear of a rear axle housing C forming part of a tractor D. Extending from the rear axle housing is a drawbar 10, which may be attached to the rear axle housing in any suitable manner or, in most cases, is formed therewith.

Our attachment includes a transversely extending shaft designated generally 11. This shaft is mounted in bearings 12 carried by angle iron frame bars 13 which extend forward in convergent relation and are attached to a beam or draft bar 14 illustrated as in the form of an I-beam. This draft bar is forked at its forward end, as at 15, and this fork is pivoted to the drawbar 10 by means of the horizontal pivot pin 17. Thus the draft bar 14 may swing vertically so that the attachment will ride properly over the ground. The draft bar might, however, have a universal joint connection with the drawbar 10, if desired. At their rear ends, the rearwardly divergent frame members 13 have attached thereto or formed therewith the upwardly extending angle iron arch 18, which extends from one bearing 12 to the other bearing. The bearings 12 may be held to the rear ends of the angle irons 13 by any suitable means as, for instance, by the pins 19. The frame bars 13, it will be seen, are in effect extensions of the draft bar 14 and transmit the draft back to the transverse shaft 11.

The shaft 11 at each end portion outwardly of the angle iron frame members 13 is square in cross-section, these squared portions being designated 20. Preferably, these squared portions are formed with central bores 21 fitting over reduced portions of the shaft 11 and pinned thereto, as shown in Figure 5, though we do not wish to be limited to this manner of forming the squared end portions of the shaft 11.

Disposed against opposite faces of each squared terminal 20 of the shaft 11 are the blocker plates 22. These plates extend in opposite directions from the shaft and are attached to the squared portion of the shaft by means of the upper and lower bolts 23, as shown clearly in Figure 2. These plates 22, therefore, constitute blades extending in opposite directions from the shaft but parallel to each other.

The shaft 11 is designed to be intermittently rotated through a half revolution by means which will be now described. This means includes a square block 24 mounted upon the middle of the shaft 11, as shown in Figure 5, and held to this shaft in any suitable manner as by the pin 25. Attached to the opposite faces of this block 24 are the trip arms 26 and 27. The butt end portions of these trip arms overlap the block 24 and are held upon the block by the bolts 27 which extend downward on each side of the block 24, so that these arms 26 are detachably supported upon the block 24. It will be noted from Figure 2 that these arms 26 and 27 extend in opposite directions from the shaft 11 and that these arms are disposed at right angles to the blocker blades 22. It will also be noted that these arms are relatively long so that, as will be hereafter described, these arms will strike the ground and assist in turning the shaft 11 to bring the blocker blades into operative position.

Coacting with each arm 26 is a sliding latch 28 operating upon the upper face of the beam 14 and below the guides 29 formed on or carried by this beam. The latch 28 has an upstanding forward end 30 and a contractile spring 31 is attached to this upstanding portion 30 of the latch and to the yoke or arch 18, so that the latch is urged into a position where its rear end will engage beneath the forward end of one or the other of the arms 26 and 27. To the upstanding end 30 of the latch is connected a pull rod 32 which extends forward, as shown in Figure 1, to a position beneath the rear axle housing of the tractor D and is there connected to an arm 33 on a rock shaft 34 mounted in bearings 35 carried by the tractor. The tractor shown is of that type in which the housing C is formed as an arch having downwardly extending lateral portions C' upon which the wheels E of the tractor are mounted. The shaft E' of each wheel extends through the corresponding downwardly extending portion C', as shown in Figure 3, and the shaft E' has attached to it the crank arm 36 illustrated as having a screw threaded shank engaged with the usual lock nut on the inner end of the shaft E'. This crank 36 carries upon it the tappet wheel 37. The rock shaft 34 has an outwardly extending arm formed in two sections. The section 38 is formed as part of the arm 34 and the section 39, as shown in Figure 4, is pivoted to the portion 38 at 40. This pivot 40 is disposed inward of the extremity of the section 38 and the section 39 normally rests against the face of the section 38 so that as the wheel 37 rotates in a clockwise direction in Figure 3, the wheel 37 will strike the pivoted section 39 of the arm and force this arm 38—39 downward, thus pulling upon the rod 32. This retracts the latch 28 and permits the blocker blades 22 to be rotated by contact of the downwardly extending blades with the ground. As the shaft 11 rotates, one of the arms 26 is depressed into contact with the ground and thus the shaft is turned through 180° so that the blocker blade that previously engaged the ground is now lifted while the blade which was previously in an upstanding position is carried downward and into engagement with the ground. The instant that the wheel 37 leaves its engagement with the arm section 39 of the rock shaft 34, the latch 28 is pulled back to its projected position by the spring 31 so that as the shaft rotates, the rearwardly extending arm 26 or 27 will engage with the latch, as shown in Figure 2.

For the purpose of lifting the attachment from the ground and rendering it inoperative, we provide a lifting rod 41 operatively connected at its rear end to the arch 18 and at its forward end connected to an operating lever 42 mounted upon the rear of the tractor in any convenient position, this operating lever moving over a toothed segment 43 and having a hand-released latching means as is common in these constructions, to hold the lever 42 in its raised or its lowered position. When the lever 42 is pulled forward, the blocker attachment will swing upon the pivot pin 17 and will be raised entirely off the ground. As seen in Fig. 1, the toothed segment 43 permits the lever 42 to be adjusted into a plurality of positions and thus the blocking or damming blades 22 may be lowered nearer to or further from the bottom of the furrow. It will be understood, of course, that the furrow has downwardly and medially inclined side walls and that while the blades 22 must strike the ground in order to rotate, yet they do not necessarily have to strike the very bottom of the furrow since most of the soil which they accumulate comes from the sides of the furrow. The soil is scraped off the sides of the furrow and this soil is deposited in the bottom of the furrow and carried along in front of the blocker until the blade trips and a dam is formed. Thus dams may be formed of various heights. In actual practice, the dams formed with any one setting of the lever 42 are very uniform since the device trips at regularly spaced intervals and whether the blocker is being used to make high dams or very low dams. These dams vary in height from two or three inches in the bottom of the lister row to twenty inches or more and extend slightly above the ridges between the lister rows. It is also pointed out that means are usually provided for raising or lowering the lister plow beams A, but that this means is entirely separate from the means whereby the beam 14 is raised or lowered, thus the blocker can be adjusted in height independently of the lister and so it is possible to have deep lister rows with small dams or high dams or shallow lister rows with either small or high dams. In other words, our adjustment provides for taking care of almost any type of soil or slope.

The operation of this mechanism will be obvious from what has gone before. As the tractor with the plows moves forward, the downwardly extending blades 22 will engage in the furrow and push forward a certain amount of earth constituting a dam or block. At a certain period in the forward movement of the tractor, the roller 37 will engage the trip arm 38—39 and rock the shaft 34, thus pulling on the rod 32 and releasing the latch. Those blades 22 which extend downward and are in engagement with the earth will now be caused to turn rearward and upward by engagement with the ground, and when the blades reach the position where they would be lifted from the ground and out of engagement therewith, one of the arms 26 will engage with the ground and will move rearward through a one-quarter revolution of the shaft 11, which will bring the other, previously upstanding, blade 22 downward into engagement with the furrow, and the operation is repeated so that by this mechanism, a block or dam is formed at spaced intervals along both furrows.

It will be noted that the blocker blades 22 may be readily disengaged for replacement or repair and that these blades may be adjusted nearer to or further from each other to suit differences in the spacing of the furrows. The arms 26 and 27 are equally readily removable and replaceable.

The trip arm formed of the parts 38 and 39, of course, is fully operative when the tractor or lister is moving forward, but when the movement of the tractor or lister is reversed, the roller 37 will simply act to lift the section 39 of the trip arm without affecting the trip arm itself or the rock shaft 34. By this construction, at every rotation of the wheel of the lister or of the tractor, a dam is thrown up across the lister furrow.

While, of course, we do not wish to be limited to this, yet it may be stated that in actual practice, the blades 22 are made of ¼ inch sheet steel 14 inches wide and approximately 15 inches long. The trip arms 26 are also made of strip steel 2 inches wide and ½ inch thick and 10 inches long. The shaft 11 is of steel and extends 10½ inches on each side of the member 24. The frame is made of angle iron 2 by 2 by 3/16 inch.

While we have illustrated the squared portions 20 and 24 of the shaft as being formed of blocks held to the shaft 11 by pins or other suitable means, it is obviously within the purview of our invention to form these squared portions either integral with the shaft 11 itself or attached thereto in any suitable manner.

While we have illustrated a rod 41 as a connection between the lever 42 and the arch 18 for the purpose of lifting the blocker out of operative position with relation to the ground, it is to be understood that a chain might be used instead of this connecting rod 41, the chain having certain advantages in that particularly it permits the blocker to rise and fall relative to the tractor and thus permits the blocker to follow the contours of the ground. This is particularly necessary on uneven ground.

It will be seen that our attachment is not operated by a lister planter. Our dam forming or blocking attachment is entirely independent of any planter and is not dependent even on the lister except that it follows in the furrows made by the lister. It will be particularly noted that the tripping is accomplished in our device by a roller 37 which is operated by the traction wheel E of the tractor mechanism. Where the tripping mechanism is actuated by a wheel of a planter, there is great liability of the additional load being imposed on the wheels of the planter, that these wheels will slip along the ground without turning and thereby fail to plant the seed or actuate the trip mechanism. It oftentimes happens on wet ground that planters skip from the wheels slipping even where there is no such additional load imposed as the operation of a trip mechanism would require. Furthermore, most of the furrow blocking should be done when no planting is being done. For instance, as soon as the crop is harvested, the land should be listed and blocked in order to catch and hold all the rain that falls, in order further to prevent blowing or wind erosion, and generally to get the land in the best possible condition for the raising of the next crop. To drag a planter along in order to operate the blocker even though no seed were being planted would be needless wear on the planter, would cause the implement to pull a heavier load and would be thus impractical. It will be seen that our implement is entirely independent even of the lister plows as these may be left off the traction mechanism and the blocker be used in previously formed furrows. It will be seen that our implement is very light in weight and occupies very little space and that it has very few moving parts which are liable to excessive wear.

It is to be understood that in the claims by the term "tractor mechanism or element" we include any wheeled tractive element whereby our attachment may be drawn over the field. Today the use of tractors is very much increased for farm work and while we have illustrated a tractor for the purpose of drawing the attachment, we do not wish to be limited to this except as stated in the appended claims.

What is claimed is:—

1. A furrow blocking attachment for listers, including a draft bar, a frame carried by the rear end of the draft bar, a transversely extending shaft rotatably mounted in the frame, terminal members approximately square in cross-section and mounted upon the extremities of said shaft, a pair of blocker blades disposed against opposite faces of the terminal members and extending in opposite directions, bolts detachably holding said blocker blades to the square terminal members, the middle portion of the shaft having a member which is square in cross-section, arms disposed against opposite faces of this square member and extending in opposite directions and in planes at right angles to the planes of the blocker blades, bolts embracing said squared portion and holding the arms in place, a sliding latch mounted upon the rear end of the draft bar, a spring urging the latch into the path of movement of the arms, a rock shaft supported forward of the rear shaft and having a crank arm, a rod connecting said crank arm to the latch, said rock shaft having an outwardly extending trip arm and a roller mounted for rotation in a closed path and at intervals engaging the trip arm to thereby release the latch at spaced intervals of time and thereby permit the rotation of the shaft under the action of earth bearing against the blocker blades and against the extremities of the arms.

2. The combination with a wheeled element having a tractor wheel and lister plows carried by the wheeled element, the wheeled element having a drawbar, of a lister attachment including a draft bar having an operative pivot connection with the drawbar, the rear end of the draft bar having a shaft supporting frame, a transversely extending shaft rotatably mounted in said frame, a pair of blocker blades operatively supported on opposite ends of the shaft, the blades of each pair extending in opposite directions, a pair of arms carried by the shaft extending in opposite directions relative to each other and at right angles to the planes of the blades, latching means engageable successively with the arms and normally holding the shaft from rotation under the action of the earth against the blocker blades, a spring urging the latching means into the path of movement of the arms, and means for retracting said latching means, including a crank rotatably mounted upon said wheeled element and operatively connected to one of the traction wheels thereof for rotation therewith, a rock shaft connected to the latch releasing rod, the rock shaft having an arm disposed in the path of movement of said crank whereby as the crank moves the rod is shifted intermittently to release said latching means.

3. The combination with a wheeled element having a tractor wheel and lister plows carried by the wheeled element, the wheeled element having a drawbar, of a lister attachment including a draft bar having an operative pivot connection with the drawbar, the rear end of the draft bar having a shaft supporting frame, a transversely extending shaft rotatably mounted in said frame, a pair of blocker blades operatively supported on opposite ends of the shaft, the blades of each pair extending in opposite directions, a pair of arms carried by the shaft extending in opposite directions relative to each other and at right angles to the planes of the blades, latching means engageable successively with the arms and normally holding the shaft from rotation under the action of the earth against the blocker blades, a spring urging the latching means into the path of movement of the arms, and means for retracting said latching means, including a crank rotatably mounted upon said wheeled element and operatively connected to one of the traction wheels thereof for rotation therewith, a rock shaft connected to the latch releasing rod, the rock shaft having an arm disposed in the path of movement of said crank whereby as the crank moves, the rod is shifted intermittently to release said latching means, the arm on the rock shaft being formed in two sections, the outermost section being pivoted to the inner section and movable with the inner section in one direction but freely movable with relation to the inner section in the other direction.

4. A furrow blocking attachment including a single medially disposed drawbar, laterally divergent frame members constituting the rear end of the drawbar and carrying spaced bearings, a shaft extending through said bearings, a pair of furrow blocking blades mounted at each end of the shaft for rotation in a vertical plane, the blades of each pair extending in opposite directions and being freely rotatable by engagement of the walls of a furrow, arms mounted upon the middle of said shaft and extending in opposite directions and at right angles to the planes of said blades, a latch mounted upon the drawbar and shiftable into position in the path of movement of the arms, means adapted to be constructed and arranged to be applied to a tractor element and operated by the traction wheel thereof for retracting said latch at intervals, and means adapted to be applied to a tractor element whereby the rear end of the drawbar may be adjustably raised to any one of a plurality of heights.

JAMES W. KENNEDY.
WILLIAM P. RAMSEY.
MARRION W. LEE.